United States Patent
Kumar et al.

(10) Patent No.: US 8,753,535 B2
(45) Date of Patent: Jun. 17, 2014

(54) COMPOSITE ABSORBENT FOR CATALYST RESIDUES REMOVAL FROM POLYOLEFIN SOLUTION POLYMERIZATION MIXTURE

(75) Inventors: Prakash Kumar, Gujarat (IN); Manoj Kumar Srivastava, Gujarat (IN); Kalpana Gopalakrishnan, Gujarat (IN); Vijay Kumar Kaushik, Gujarat (IN); Vijayalakshmi Ravi Puranik, Gujarat (IN)

(73) Assignee: Reliance Industries Ltd, Reliance Technology Group, Maharashtra (IN)

( * ) Notice: Subject to any disclaimer, the term of this patent is extended or adjusted under 35 U.S.C. 154(b) by 186 days.

(21) Appl. No.: 13/522,533

(22) PCT Filed: Jan. 11, 2011

(86) PCT No.: PCT/IN2011/000022
§ 371 (c)(1),
(2), (4) Date: Jul. 17, 2012

(87) PCT Pub. No.: WO2011/086578
PCT Pub. Date: Jul. 21, 2011

(65) Prior Publication Data
US 2013/0341563 A1 Dec. 26, 2013

(30) Foreign Application Priority Data
Jan. 15, 2010 (IN) .................. 2106/MUM/2009

(51) Int. Cl.
*B01J 20/12* (2006.01)
*B01J 20/08* (2006.01)
*B01J 20/04* (2006.01)

(52) U.S. Cl.
USPC .............. 252/184; 502/63; 502/12; 502/72; 502/80; 502/84

(58) Field of Classification Search
CPC .......... B01J 20/12; B01J 20/04; B01J 20/041; B01J 20/08; B01J 37/30
See application file for complete search history.

(56) References Cited

U.S. PATENT DOCUMENTS

| 3,235,089 | A | * | 2/1966 | Burroughs ................. 210/510.1 |
| 3,526,322 | A | * | 9/1970 | Burroughs ..................... 502/63 |
| 3,899,310 | A | * | 8/1975 | Chi et al. ....................... 95/141 |

(Continued)

FOREIGN PATENT DOCUMENTS

| WO | 01/45839 A1 | 6/2001 |
| WO | 2005/049660 A1 | 6/2005 |
| WO | 2008/010862 A1 | 1/2008 |

OTHER PUBLICATIONS

International Search Report (ISR) mailed on Aug. 11, 2011 by the International Searching Authority of the State Intellectual Property Office, the P.R. China, in the counterpart International Application No. PCT/IN2011/000022.

*Primary Examiner* — Joseph D Anthony
(74) *Attorney, Agent, or Firm* — Gottlieb, Rackman & Reisman, P.C.

(57) ABSTRACT

A solid shaped composite adsorbent for reducing deactivated catalyst residues and contaminants from a post polyolefin solution polymerization mixture is disclosed. The composite adsorbent comprises 70-90 wt % of an alumina component; 30-10 wt % of a clay component; and 0.5-3.5 wt % of at least one alkali metal component selected from the group consisting of elements in Group 1A of the modern periodic table.

8 Claims, 4 Drawing Sheets

(56) References Cited

U.S. PATENT DOCUMENTS

Figure 1:
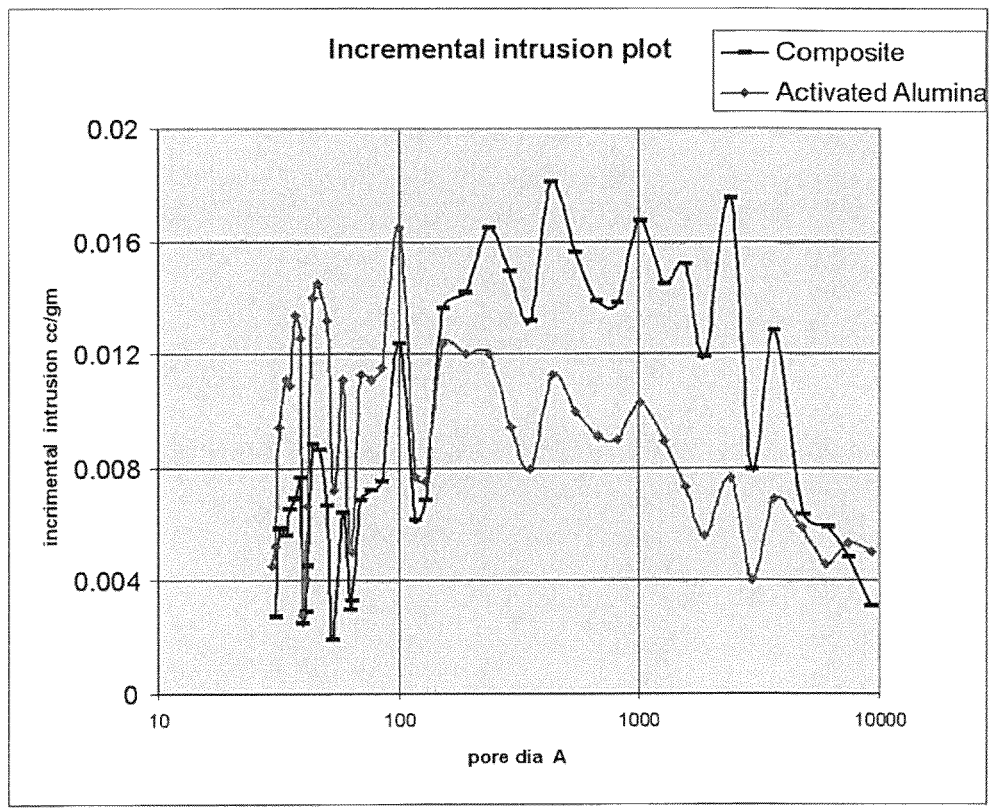

| | | | |
|---|---|---|---|
| 4,762,537 A * | 8/1988 | Fleming et al. | 95/132 |
| 5,288,849 A * | 2/1994 | Garcin et al. | 528/482 |
| 5,935,894 A * | 8/1999 | Kanazirev | 502/341 |
| 6,451,200 B1 * | 9/2002 | Lussier et al. | 208/300 |
| 6,632,766 B2 * | 10/2003 | Kanazirev | 502/64 |
| 2008/0029039 A1 * | 2/2008 | Jenkins | 119/173 |

* cited by examiner

COMPOSITE ABSORBENT FOR CATALYST RESIDUES REMOVAL FROM POLYOLEFIN SOLUTION POLYMERIZATION MIXTURE

FIELD OF THE DISCLOSURE

This disclosure relates to adsorbents for adsorbing deactivated catalyst residues and other contaminants from a post polyolefin solution polymerization mixtures.

BACKGROUND

Synthesis of polyethylene (PE) in solution polymerization is achieved using transition metal based catalysts, namely titanium tetrachloride ($TiCl_4$) and vanadium oxy trichloride ($VOCl_3$) and co-catalyst such as Triethylaluminium (TEAL, $Al(C_2H_5)_3$). During the polymerization process the co-catalyst gets converted to $Al(C_2H_5)_2Cl, Al(C_2H_5)Cl_2$ and finally to $AlCl_3$. Some by-products like butene-2, octene-2 are also formed during polymerization due to isomerization of co-monomers like butane-1 and octane-1. Deactivation substances are also added to prevent isomerization. Deactivation of the catalyst is carried out after polymerization to terminate the polymerization reaction and to maximize the polymer product color. Organic fatty acids ($C_8$-$C_{10}$), such as n-nonanoic acid and the like, are used as deactivators.

Deactivated catalyst residues as well as deactivator material are removed by passing the polymer solution through a fixed adsorbent bed called solution adsorber loaded with activated alumina at operating conditions of pressure and temperature like 120-150 kg/cm$^2$ and at 220-300° C.

Activated alumina is used as the adsorbent of choice to remove the catalyst and co-catalyst residues present in the form of chlorides like TiCl3, VOCl2/VOCl organometallic complexes (catalyst residues) and Al(C2H5)2Cl coming from the unreacted or deactivated catalyst and carboxylic acid from deactivator $C_8$-$C_{10}$ organic fatty acids.

Activated alumina used for adsorptive removal of catalyst residues (organometallic complexes) is porous gamma alumina. Activated alumina performs adsorption both by physisorption as well as chemisorption. Activated alumina is chosen as the adsorbent, not only because of its porous structure and high surface area, but also because of the availability of acid and base sites as Lewis and Bronsted sites on its surface that play an important role in the removal of deactivated catalyst residues, especially in the case of ethylene copolymers.

Isomerization of the comonomer butene is another parameter for adsorbent selection. Lewis acid sites available on the alumina surface are responsible for isomerization of 1-butene to 2-butene (cis and trans) at high operating temperature of 280° C. Isomerization is expected to be severe at the start of the adsorber bed operation and is further impacted by hold up time of the comonomer with the alumina. Activated alumina is treated with sodium salts during commercial manufacture to minimize isomerization. Optionally, low concentration of sodium salts doping up-to 3 wt % not only reduces the isomerization effect but also enhances the color of the polyethylene resin product.

Crush strength of the fresh and spent alumina is an indicative element of the resistance of the alumina to compaction of the adsorber. Higher the crush strength better is the ability to withstand the effect of melt index changes of the polyethylene mixture. Attrition loss is indicative of the amount of alumina that is expected to be lost by the alumina element rubbing together. Fines resulting from attrition tend to create undesirable fish eyes in the polymer as well channeling in the adsorber bed.

Activated alumina adsorbents used for treating polymer solutions for removal of deactivated catalyst residue are associated with problems like formation of dust due to lower crush strength and attrition leading to high pressure drop across the bed ultimately affecting the resulting throughput. Most of the organometallic residues being relatively larger sized complexes are adsorbed only on the surface with the core of the alumina being left unutilized. This phenomenon is compensated by using smaller sized alumina balls which in turn may lead to higher pressure drop across the adsorber on account of lower crush strength and increased attrition.

No remedy to the above problem has been reported in the literature, it is therefore desirable to have an adsorbent having superior adsorption of deactivated catalyst residues.

A composite alumina-zeolite adsorbent is disclosed in U.S. Pat. No. 3,899,310 which is claimed to adsorb fatty acid compounds from refrigerant gases. The composite adsorbent takes up about 30 mg. of fatty acid per gram of adsorbent, while alumina takes up about 21 mg. of fatty acid and zeolites about 9 mg. of fatty acid per gram of adsorbent indicating superiority of the disclosed adsorbent composite over individual components. It is also suggested in the disclosure that alumina-zeolite composites can be substantially strengthened by moisture treatment.

A method of preparing alumina-based bodies suitable for use as adsorbents or catalysts is disclosed in U.S. Pat. No. 5,935,894 to provide composite bodies either by spraying or soaking the aqueous solutions containing the alumina powder and the alkali metals and the soluble carboxylic acid. Thereafter, the bodies are thermally treated to activate alumina therein and remove or decompose the organic part, e.g., carboxylic acid, of the soluble carboxylic acid alkali metal salt.

U.S. Pat. No. 4,762,537 discloses the use of an adsorbent comprising zeolite Y and alumina to remove HCl from hydrogen gas. U.S. Pat. No. 6,013,600 discloses the use of alumina with alkali and alkaline earth metals for removing HCl and other contaminants. Composite solid shaped adsorbents comprising an alumina, zeolite and metal component for removal of acidic impurities and organic compounds from ethylene stream are disclosed in U.S. Pat. No. 66,632,766.

Canadian patent 732279 discloses use of activated alumina for removal of deactivated catalyst residues from polymerization reaction in a solution polymerization process.

An object of the present disclosure is to provide an attrition-resistant, shaped, solid, composite adsorbent for adsorption of deactivated catalyst residues and deactivation materials from polyolefin in the solution polymerization technology under critical process conditions of temperature and pressure.

A related object of the disclosure is, therefore, also to provide a method for producing said composite adsorbent with additional properties like porosity & lower surface reactivity.

SUMMARY OF THE DISCLOSURE

In accordance with the present disclosure, there is provided a solid shaped composite adsorbent for reducing deactivated catalyst residues and contaminants from a post polyolefin solution polymerization mixture, said composite adsorbent comprising:
(A) 70-90 wt % of an alumina component;
(B) 30-10 wt % of a clay component; and (C) 0.5-3.5 wt % of at least one alkali metal component selected from the group consisting of elements in Group 1A of the modem periodic table.

Typically, the alumina component (A) is activated alumina, the clay component (B) is selected from the group comprising of kaoline, bentonite and any mixture thereof and the alkali metal component (C) is a sodium (Na) compound.

Typically, the activated alumina component has particle size in the range of 4-10 microns.

Typically, the clay component has particle size in the range of 7-12 microns.

Typically, the adsorbent has surface area in the range of 150 $m^2/g$ to 250 $m^2/gm$.

Typically, the adsorbent is predominantly macroporous in nature with pores having diameter in the range of 100 A to 10000 A.

In accordance with the present disclosure, there is provided a method for preparing a shaped, solid composite adsorbent for reducing deactivated catalyst residues and contaminants from a post-polymerization polyolefin solution polymerization mixture, said method characterized by the following steps in sequence:

a. sizing activated alumina to an average particle size of about less than 10 microns and clay particles to average particle size of about 7 to 12 microns; homogenously blending the sized alumina and clay particles in a ball milling thereby forming a blend comprising about 70-90 wt % alumina and about 30-10 wt % of kaolin clay;

b. agglomerating the sized and blended alumina-clay particles in the presence of water to form a shaped article selected from the group consisting of irregular shapes, extrudates, and spheres;

c. curing and drying the sized shaped articles in a closed atmosphere at temperature ranging from from ambient to 150° C. and for a time period of about 30 minutes to about 24 hrs.

d. calcining the dried sized shaped articles at temperatures from 550° C. to 650° C. and over a period of about 1-4 hrs; and e. contacting the calcined shaped articles with an aqueous solution of an alkali metal compounds after cooling the calcined shaped articles.

Typically, the process includes making the agglomerated bodies in the form of spheres in the range of 12 Tyler to 8 Tyler mesh in size.

Typically, the metal precursor is selected from the group comprising carboxylate salts of the metal; carbonate compounds of the metal and hydroxide compounds of the metal and combination thereof.

Typically, the metal precursor is an acetate compound of the alkali element.

Typically, the activation conditions of the solid spherical shaped composite adsorbent include a temperature of about 300 to 500° C. and time of about 10 to 120 minutes.

Typically, the method includes the step of air drying the shaped articles in an air oven under air flow.

BRIEF DESCRIPTION OF THE ACCOMPANYING DRAWINGS

Figure 2:
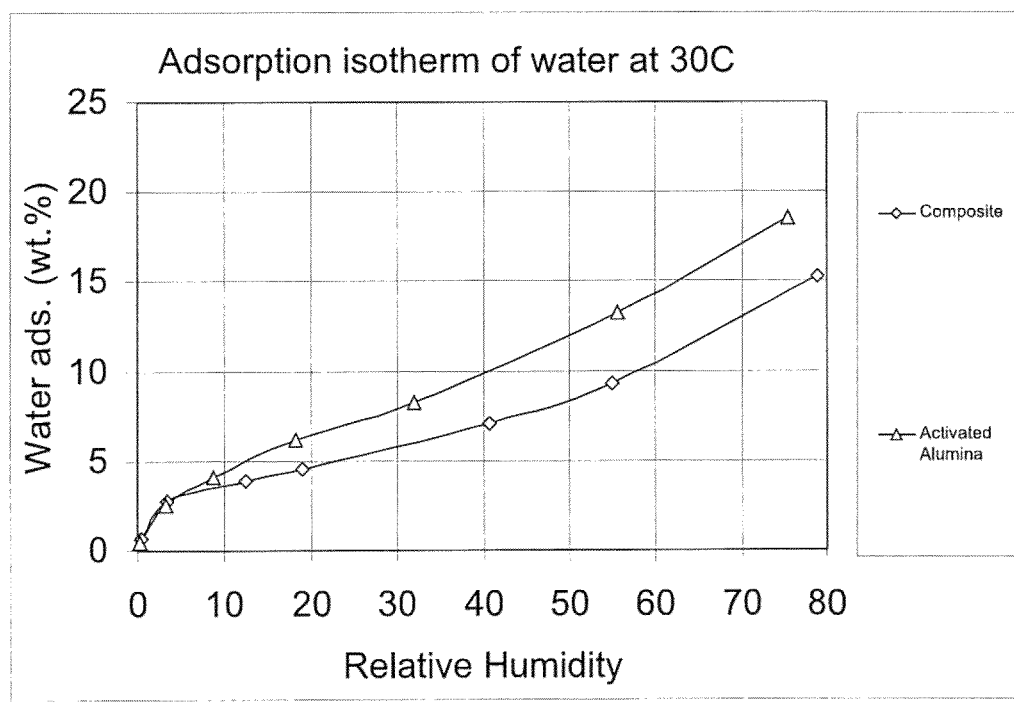
Figure 3:
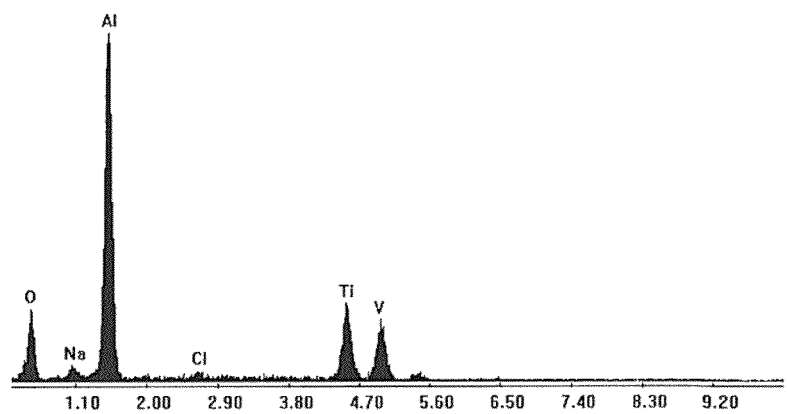
Figure 3:
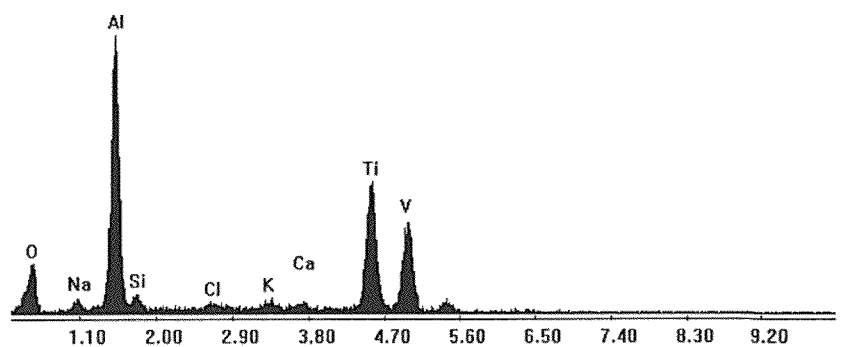
Figure 4:
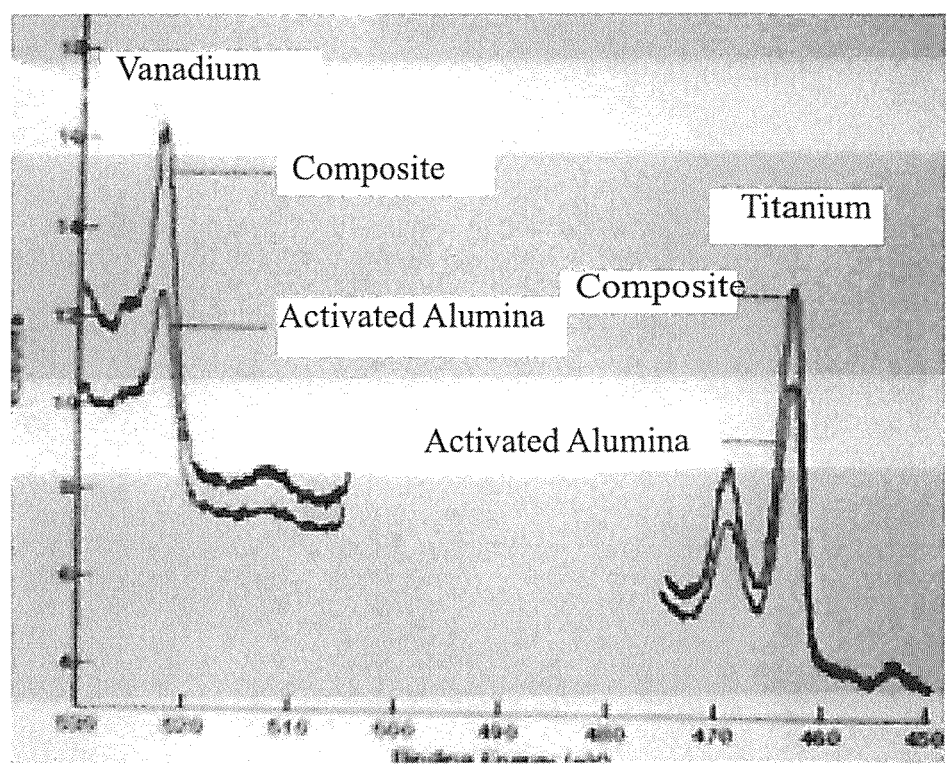

FIG. 1 of the present disclosure illustrates porosity incremental intrusion with mercury porosimetry;

FIG. 2 of the present disclosure illustrates water adsorption isotherm at 30° C.;

FIG. 3 of the present disclosure represents EDAX spectra images of composite and activated alumina showing higher pick up of Ti and V composite adsorbent after catalyst residues adsorption for Example-1;

FIG. 4 of the present disclosure illustrates ESCA data showing comparison of Ti and V pick up on the surface of activated alumina and composite adsorbent after catalyst residues adsorption for Example-1.

DETAILED DESCRIPTION OF THE DISCLOSURE

Composite adsorbent envisaged in the present disclosure comprises a solid shaped adsorbent and a process for preparing the adsorbent. A starting material for making the composite adsorbent are alumina powder having the average particle size of about 60 to 80 microns. Activated alumina powder is preferably obtained by rapid dehydration of aluminum hydroxide like alumina trihydrate in a stream of hot gas in the temperature range of 350-1000° C. in a suitable apparatus. The duration of contact between alumina trihydrate and the hot gas is for less than a minute which may last from a fraction of second to several seconds, the preferred contact time being 3-6 seconds. Method of such rapid activation is well known in art and the process is commonly referred to as flash calcination. The alumina once activated is an amorphous transition alumina and is grounded to 1-20 microns more preferably about 4-10 microns of average particle size after rapid activation. Any grinding technique known to those skilled in art may be used. Activated alumina has LOI of about 5-8 wt % in the temperature range of 250-1000° C. with 6-7 wt % being typical.

The other necessary starting material for the present disclosure is clay selected from Kaolinite group of clay minerals having average particle size of 40-60 microns. Kaolinite clay is de-agglomerated into particles having an average size of about 4-10 microns more preferably <8 microns. Activated alumina powder and Kaoline clay are ground and mixed together and further ground to form dry powder blends in different ratios ranging from 70-90 wt % of activated alumina powder and balance clay to form a homogenous powder mixture blend. These materials are mixed together and ground to an average particle size of 5-10 microns. Any grinding technique known to those skilled in the art may be used. The homogeneous mixture is essential to form uniform shapes like spheres or extrudates. In a particularly preferred embodiment about 70 wt % of activated alumina powder and about 30 wt % of clay are mixed together and are formed into shaped articles like extrudates or spheres with addition of water to the dry blend. Preferred method of forming of spheres involves use of a pan nodulizer and is well known to those skilled in art. The formed shaped balls or spheres are cured by heating at 90-130° C. for about 12-24 hrs in a humid atmosphere. This curing is conducted in a closed container so that the prepared composites are in self generated steam. Curing of shaped bodies by this method produces composites having a high dry and wet strength without affecting the adsorptive properties of the composite adsorbent.

Post curing prepared composite adsorbent formed bodies are dried to a water content of less than about 15 wt % and this is accomplished by heating the composites to about 100-125° C. in an open atmosphere for about 2-48 hrs. Further dried composites are activated by heating to 150 to 650° C. for about 1 to 5 hrs and closely held water molecules within the alumina and kaolin clay mixture are removed making the prepared composite adsorbent suitable for impregnating with alkali metal salts. The prepared composite adsorbents are strong enough to be used as commercially useful adsorbents. The composite adsorbents prepared will be useful if they have a high adsorption capacity for deactivated catalyst residues and are also strong when in a dry state.

A particularly preferred spherical agglomerated composite adsorbent having 8-10 mesh size (Tyler series) has about 270 m²/g surface area, 0.47 cc/g total pore volume, LOI of 2.8 wt % at 280-1000° C., crush strength about 5.5 kgf and bulk density of about 0.80 gm/cc of formed composites spheres. The agglomerated composite spheres have almost zero attrition compared to activated alumina, which is an important parameter required for a polymerization mixture purification adsorbent in a solution polymerization adsorber. Deactivated organometallic chloride catalyst residues and free hydrochloric acid attack the activated alumina which results in deterioration of the prior art activated alumina agglomerates like dust formation and sintering which is undesirable.

The formed composite agglomerated spheres are used as a support for doping with alkali salts. The shaped composite agglomerated spheres are further treated with an alkaline metal solution selected from the group consisting of alkali metals. Metal solutions can include salts of sodium, potassium and lithium. The choice of the metal solution depends on its decomposition to metal oxides at activation conditions. Specific examples of these metal solution included sodium chloride, sodium acetate, sodium hydroxide or mixtures thereof, while other potassium and lithium salts can also be used. Formed composite adsorbent supports are doped in the solutions of metal solutions with varying compositions of alkali metal salt solution and water. Solutions of the desired metal compounds are prepared in an aqueous medium having pH variation from 7 to 14. The prepared metal solutions are used as such without pH adjustment further.

In one method alumina clay composite agglomerated spheres and activated alumina balls are doped in an aqueous solution of the desired metal compound for 1-4 hrs. Doped composite agglomerates and activated alumina balls are further air dried for 1-24 hrs in an open atmosphere. The amount of metal solution varies considerably but must be present in 0.5 to 5 wt % on the prepared composites.

In accordance with another method of forming the composite adsorbent, the alumina, kaolin clay and an aqueous solution of the desired metal compound are mixed together and formed into a shaped article such as cylindrical pellets of 1/8" or 1/16" size or tablets or spheres by methods well known in art.

Drying of doped composites is achieved in batches like in bins or trays or in a continuous process using a moving belt. The dried composite adsorbent is further oven dried in the temperature range of 100-180° C. and finally activated at 500-600° C. under air atmosphere for a time period of ½ hr to 4 hrs. The activation can be done in trays in a furnace with continuous air flow enough to carry away moisture released from air dried composites. The surface area of metal compounds doped activated alumina and composite adsorbents is reduced to >200 m2/gm and >140 m2/gm and pore volume 0.34 cc/gm and 0.32 cc/gm respectively. A comparison of physicochemical properties for the adsorbent of the disclosure and prior art activated alumina sodium doped adsorbent is compiled in Table-1 indicating that the composite adsorbent has significantly better physical properties compared to activated alumina alone.

TABLE 1

Physicochemical properties comparison of adsorbents

| SAMPLE | Composite | Activated Alumina |
|---|---|---|
| Water Adsorption Capacity at 30° C., 70 RH | 13 wt % | 17 wt % |
| Crush strength | 5.5 Kgf | 3.95 Kgf |
| Attrition loss | 0.01 wt % | 0.5 wt % |
| BET surface Area | 150 m2/g | 210 m2/g |
| Pore Volume | 0.32 cc/g | 0.34 cc/g |
| LOI 280-1000° C., 2 hrs | 3 wt % | 7.5 wt % |
| Bulk Density | 0.8 gm/cc | 0.75 gm/cc |
| Na2O | 0.90 wt % | 0.85 wt % |

The present disclosure also envisages a method of producing adsorbents with a high macroporosity and to their use for adsorption of catalyst residues from polymerization mixture of solution polymerization. The term "macroporosity" should be understood to mean, in accordance with the IUPAC data, a pore having a diameter greater than 100 Å. FIG. 1 of the accompanying drawings shows mercury porosimetry data indicating the composite adsorbent of this disclosure has higher macroporosity compared to activated alumina. More specifically, the present disclosure relates to a macroporous adsorbent comprising pores having a 69% pore volume in the composite adsorbent and activated alumina having 47% pore volume arising from >100 A° pore diameter. The macroporous composite adsorbents have higher catalyst residue adsorption from the polymerization mixture compared to activated alumina. The water adsorption capacity of the composite adsorbent is <15 wt % at saturation vapor pressure as shown in FIG. 2 of the accompanying drawings.

Clay by itself is not known as a sorbent for the adsorbate (i.e. catalyst residue of the composition), though it is known to impart certain mechanical property enhancement to materials where it is incorporated. Yet, however the overall macroporosity and resultant adsorptive efficacy of the present composition has increased due to incorporation of clay, which showcases a synergistic property enhancement in the combination of silica and clay.

The description of the disclosure is now further illustrated by the following examples. It is to be understood that the examples are only by way of illustration and are not intend as an undue limitation on the wide scope of the disclosure as set forth in the appended claims.

Example 1

Composite adsorbent spherical balls were prepared containing alumina powder and kaolin clay in a rotating pan device. Spherical beads were continuously formed by simultaneously adding active alumina and kaolin clay blended with spraying water. The spherical balls which had particle size distribution from 8-12 Tyler mesh were cured at 90-100° C. for three hours in a closed container. The cured beads were air dried in a oven at 130° C. for 6 hrs followed by calcination at 600° C. for 4 hrs under air flow. The calcined beads were cooled and doped in the aqueous solution of an acetate. The doping was achieved by keeping the calcined beads in the aqueous solution of 1 gm of sodium acetate in 100 gm of adsorbent in a rotating pan device. The sample was air dried for 12 hrs followed by oven drying at 150° C. for 12 hrs. Finally dried doped beads were activated at 450° C. for 4 hrs under air flow. Sodium content on the beads on the volatile free basis was about 0.90 wt %. Prior art activated alumina balls of similar size range were doped with sodium acetate to and dried and activated under identical conditions as composite adsorbent to achieve 0.85 wt % sodium content on volatile free basis.

Example 2

The procedure set forth in example 1 was used to dope prepared balls except that solution containing 2 wt % of sodium acetate was used to dope the 100 gm of composite adsorbent balls to achieve sodium content on thus prepared beads on volatile free basis was about 2.1 wt %. Similarly 100 gm of activated prior art alumina balls were also doped with sodium acetate under identical conditions as composite adsorbent to achieve 2.5 wt % sodium content on volatile free basis.

Example 3

The procedure set forth in example 1 was used to dope prepared balls except that solution containing 3 wt % of sodium acetate was used to dope the 100 gm of composite adsorbent balls to achieve sodium content on the prepared beads on volatile free basis was about 3.4 wt %. Similarly 100 gm of prior art activated alumina balls were also doped with sodium acetate under identical conditions as composite adsorbent balls to achieve 3.1 wt % sodium content on volatile free basis.

Example 4

The sodium doped composite adsorbent and prior art alumina as prepared in example 1-3 were tested for organometallic catalyst residue pick in a fixed polyethylene melt purification solution adsorber of commercial solution polymerization unit during linear low density polyethylene (LLDPE) manufacture. The sodium doped composite adsorbent and activated alumina balls samples of 250 gm each was placed in meshed metal cages at the inlet of a melt purification adsorber for 48 hrs. The mesh size was enough for the free flow of melt adsorber at 280° C. and 140 bar pressure. Samples were taken out during unloading of the adsorber and analyzed for oragnometallic residues adsorbed by samples. The samples were analyzed for Ti and V adsorption by ICP elemental analysis. The results are presented in tables 2A & 2B and show that the composite adsorbent has adsorbed higher amount of Titanium and Vanadium catalyst residues compared to activated alumina. Total chloride adsorbed on the composite and activated alumina are given in table 3 and shows that composite adsorbent adsorbed considerably higher amount of total chlorides as determined by the turbidity method. Similarly FIGS. 3 and 4 shows higher adsorption of titanium and vanadium on the composite adsorbent compared to activated alumina wherein surface sensitive EDXA (Energy Dispersive X-ray Analysis) and ESCA (Electron Spectroscopy Chemical analysis) techniques were used for comparison. In FIGS. 3 and 4, titanium and vanadium catalyst residues on adsorbent surface are compared for activated alumina and composite adsorbent which shows higher pickup of residues on composite adsorbent.

TABLE 2A

Titanium adsorption on different loadings in LLDPE mixture, wt %

| SAMPLE | Composite | Activated alumina |
|---|---|---|
| Example - 1 | 0.27 wt % | 0.14 wt % |
| Example - 2 | 0.35 wt % | 0.21 wt % |
| Example - 3 | 0.41 wt % | 0.37 wt % |

TABLE 2B

Vanadium adsorption on different loadings in LLDPE mixture, wt %

| SAMPLE | Composite | Activated alumina |
|---|---|---|
| Example - 1 | 0.25 wt % | 0.21 wt % |
| Example - 2 | 0.25 wt % | 0.16 wt % |
| Example - 3 | 0.18 wt % | 0.15 wt % |

TABLE 3

Total Chloride adsorption in LLDPE mixture, wt %

| SAMPLE | Composite | Activated Alumina |
|---|---|---|
| Example 1 | 0.93 wt % | 0.76 wt % |
| Example 3 | 2.07 wt % | 1.65 wt % |

Further Examples

The procedure set forth in example 1 was used to dope the prepared balls with solutions containing chlorides, hydroxides, and carbonates of alkali metals such as sodium, potassium and lithium (NaCl, NaOH, $Na_2CO_3$, KCl, $K_2CO_3$, KOH and $Li_2CO_3$, LiCl and LiOH) in different wt % and it was found that the doping was satisfactory and their activity for adsorption of the residues were also roughly similar to the results obtained for the doping as per examples 1, 2 and 3.

The invention claimed is:

1. A solid shaped composite adsorbent for reducing deactivated catalyst residues and contaminants from a post polyolefin solution polymerization mixture, said composite adsorbent comprising:
    (A) 70-90 wt % of an activated alumina component;
    (B) 30-10 wt % of a clay component; and
    (C) 0.5-3.5 wt % of at least one alkali metal component selected from the group consisting of elements in Group 1A of the modern periodic table; wherein the method of forming the solid shaped composite adsorbent comprises in part homogenously blending the activated alumina component and clay component together prior to forming the shaped composite adsorbent product.

2. The composite adsorbent as claimed in claim 1 wherein the clay component (B) is selected from the group consisting of kaoline, bentonite and any mixture thereof.

3. The composite adsorbent as claimed in claim 1 wherein the alkali metal component (C) is a sodium (Na) compound.

4. The composite adsorbent as claimed in claim 1 wherein the alumina component has particle size in the range of 4-10 microns.

5. The adsorbent as claimed in claim 1 wherein the clay component has particle size in the range of 7-12 microns.

6. The composite adsorbent as claimed in claim 1 wherein said adsorbent has surface area in the range of 150 $m^2$/g to 250 $m^2$/gm.

7. The composite adsorbent as claimed in claim 1 wherein the adsorbent is predominantly macroporous in nature with pores having diameter in the range of 100 A° to 10000 A°.

8. The composite adsorbent as claimed in claim 1 wherein the alumina is activated alumina having particle size in the range of 4 to 10 microns and clay component is selected from the group consisting of kaoline, bentonite and any mixtures thereof having the particle size in the range of 7-12 microns and alkali metal component is a sodium (Na) compound.

* * * * *